(12) United States Patent
Liu

(10) Patent No.: US 12,507,945 B2
(45) Date of Patent: Dec. 30, 2025

(54) NASOGASTRIC TUBE CAPABLE OF SENSING STOMACH ACID

(71) Applicants: Changhua Christian Medical Foundation Changhua Christian Hospital, Changhua (TW); Phartronic Co., Ltd., Hukou Township (TW)

(72) Inventor: Sen-Yung Liu, Changhua (TW)

(73) Assignees: Changhua Christian Medical Foundation Changhua, Changhua (TW); Christian Hospital and Phartronic Co., Ltd., Hukou Township (TW)

( * ) Notice: Subject to any disclaimer, the term of this patent is extended or adjusted under 35 U.S.C. 154(b) by 941 days.

(21) Appl. No.: 17/691,232

(22) Filed: Mar. 10, 2022

(65) Prior Publication Data
US 2023/0284967 A1  Sep. 14, 2023

(51) Int. Cl.
*A61B 5/00* (2006.01)
*A61B 5/145* (2006.01)

(52) U.S. Cl.
CPC .......... *A61B 5/4238* (2013.01); *A61B 5/0031* (2013.01); *A61B 5/14539* (2013.01)

(58) Field of Classification Search
CPC . A61B 5/4238; A61B 5/0031; A61B 5/14539; A61B 5/073; A61B 5/14507; A61B 5/1473
See application file for complete search history.

(56) References Cited

U.S. PATENT DOCUMENTS

| | | | | |
|---|---|---|---|---|
| 4,381,011 A | * | 4/1983 | Somers, 3rd | A61B 5/14539 600/350 |
| 8,115,618 B2 | * | 2/2012 | Robertson | A61B 1/00016 340/539.12 |
| 2009/0209849 A1 | * | 8/2009 | Rowe | A61B 5/14539 340/8.1 |
| 2018/0055740 A1 | * | 3/2018 | Singh | A61N 1/0509 |
| 2021/0030480 A1 | * | 2/2021 | McMichael | A61B 5/743 |

FOREIGN PATENT DOCUMENTS

WO  WO-2019157568 A1 * 8/2019

* cited by examiner

*Primary Examiner* — Abid A Mustansir
(74) *Attorney, Agent, or Firm* — Best & Flanagan LLP

(57) ABSTRACT

A nasogastric tube contains: a body, a plug, and a pH (potential of hydrogen) sensor. The body includes a feeding portion, a discharging portion, and a conduit. The feeding portion has a cap, and the discharging portion has multiple through orifices. The plug includes a connecting portion and a protruded portion. The protruded portion has a smooth surface. The pH sensor is injection molded to integrate into the plug, and the pH sensor includes a pH sensing element and two antennas. The pH sensing element is made of conducting material which is configured to produce different voltage response with a pH ion concentration in gastric juice. The pH value of the gastric juice measured by the pH sensing element is wirelessly send by the two antennas to a reader, and the pH value of the gastric juice measured is displayed on the reader.

1 Claim, 7 Drawing Sheets

NASOGASTRIC TUBE CAPABLE OF SENSING STOMACH ACID

BACKGROUND OF THE INVENTION

Field of the Invention

The present invention relates to a nasogastric tube, and more particularly to the nasogastric tube which is capable of sensing stomach acid.

Description of the Prior Art

With a development of science and technology and an advancement of medical technology, a survival rate of patients has been relatively improved. However, when patients cannot eat themselves because of injury, illness or aging, medical personnel are required to force-feed through a nasogastric tube feeder, that is, intubation. Accordingly, nutritional products are processed into a liquid food which is introduced into a stomach via a nasal cavity to supply the patient with normal heat and nutrition. In addition, the patient's gastric juice can be extracted through the nasogastric tube to detect gastric acid value of the patient, thus judging a physical condition of the patient to force-feeding or drug-feeding timely.

It is known to use a nasogastric tube to detect the gastric acid value of a patient, and it is necessary to extract the patient's gastric juice through the nasogastric tube, then a test strip is applied to test. However, the defects are difficult to control a force to cause discomfort of the patient during the extraction of gastric juice, too much extraction often occurs to result in waste of gastric juice, or it cannot be extracted. Furthermore, the gastric juice in the tube after extraction will flow back, increasing the pain of the patient.

Also, in the medical process, it is essential to continuously and accurately measure the pH (potential of hydrogen) value of gastric juice. Nevertheless, conventional pH meters require reference electrodes, which will lead to electrolyte leakage and potential contamination, and they are too bulky to be integrated into the stomach with a nasogastric tube.

The present invention has arisen to mitigate and/or obviate the afore-described disadvantages.

SUMMARY OF THE INVENTION

The primary object of the present invention is to provide a nasogastric tube which contains a pH (potential of hydrogen) sensor integrate into a plug and configured to receive and send wirelessly so that a pH value of a gastric juice is measured successively, and a medical personnel judges a physical condition of a patient accurately to feed liquid food or give medicine timely.

Another object of the present invention is to provide a nasogastric tube by which when detecting the pH value of the gastric juice, a reader directly receives the pH value which is wirelessly send from the pH sensor, thus avoiding extracting the gastric juice of the patient, relieving a pain of testing gastric acid and a workload of medical personnel.

To obtain above-mentioned aspects, a nasogastric tube provided by the present invention contains: a body, a plug, and a potential of hydrogen (pH) sensor.

The body includes a feeding portion formed on a first end of the body, a discharging portion formed on a second end of the body, and a conduit defined in the body and communicating with the feeding portion and the discharging portion. The feeding portion has a cap configured to open and close the feeding and to close the conduit, and the discharging portion has multiple through orifices defined thereon and communicating with the conduit.

The plug includes a connecting portion and a protruded portion. The connecting portion is formed in a column shape and is fitted on a distal end of the discharging portion, and the protruded portion is exposed outside the distal end of the discharging portion. The protruded portion has a smooth surface.

The potential of hydrogen (pH) sensor is injection molded to integrate into the plug, the pH sensor includes a pH sensing element and two antennas which partially expose in the conduit. The pH sensing element is made of conducting material which is configured to produce different voltage response with a pH ion concentration in gastric juice, such that the pH sensing element is configured to measure a pH value of the gastric juice. One of the two antennas is configured to receive, and the other antenna is configured to send. The pH value of the gastric juice measured by the pH sensing element is wirelessly send by the two antennas to a reader, and the pH value of the gastric juice measured is displayed on the reader.

DETAILED DESCRIPTION OF THE PREFERRED EMBODIMENTS

Figure 1:
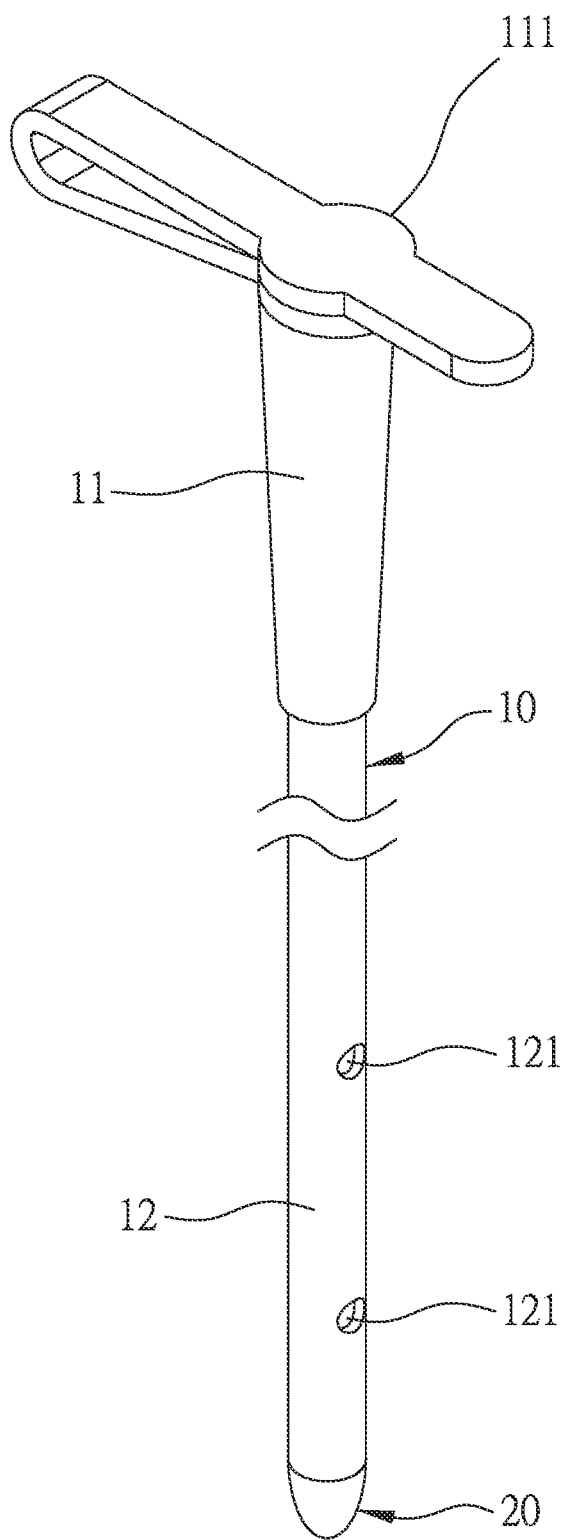
FIG. 1 is a perspective view showing the assembly of a nasogastric tube according to a preferred embodiment of the present invention.
Figure 2:
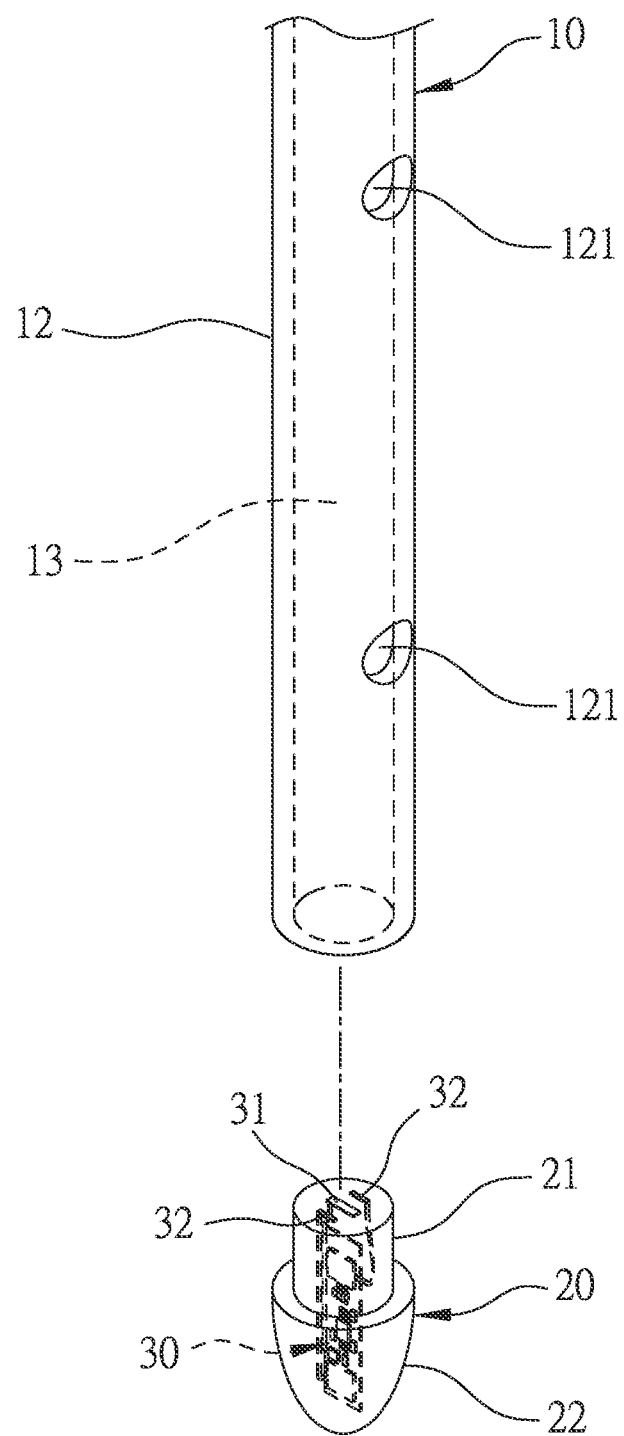
FIG. 2 is a perspective view showing the exploded components of the nasogastric tube according to the preferred embodiment of the present invention.
Figure 3:
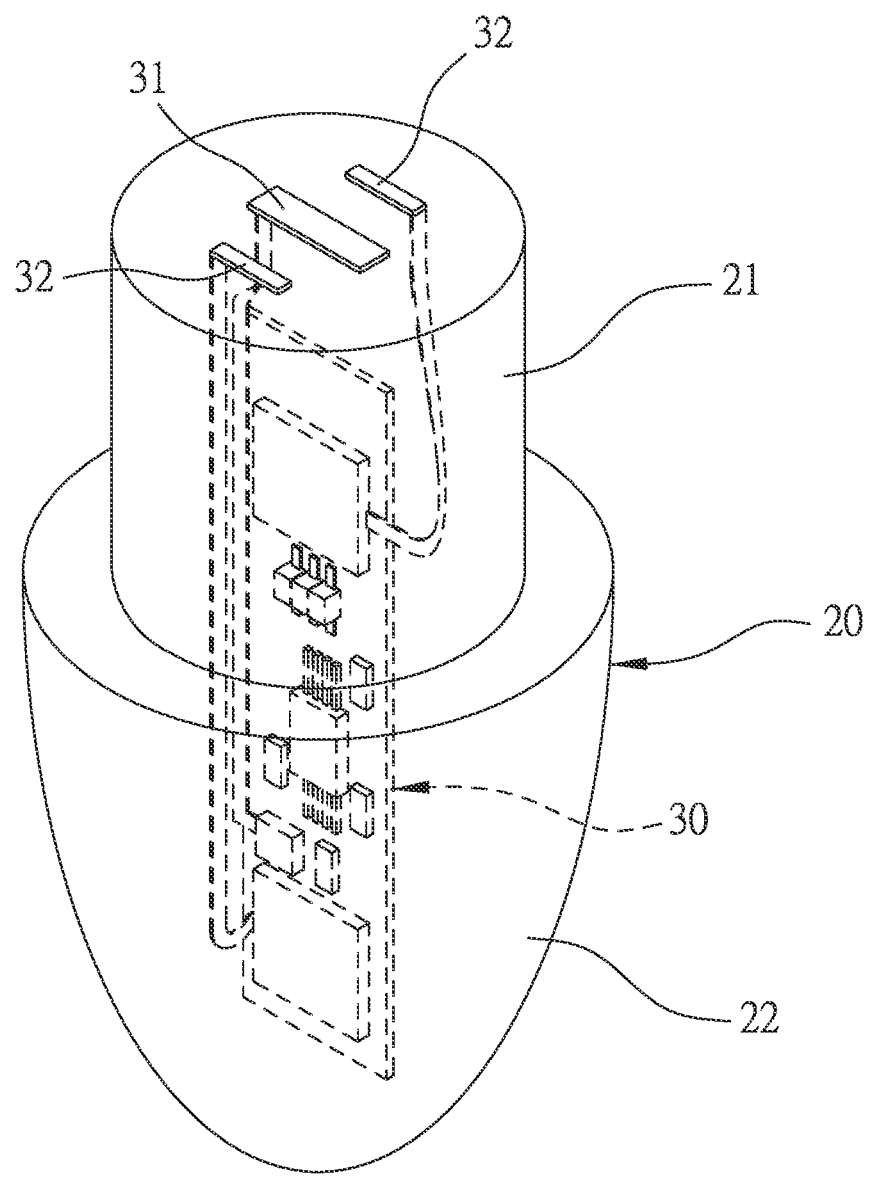
FIG. 3 is a perspective view showing the assembly components of a part of the nasogastric tube according to the preferred embodiment of the present invention.
Figure 4:
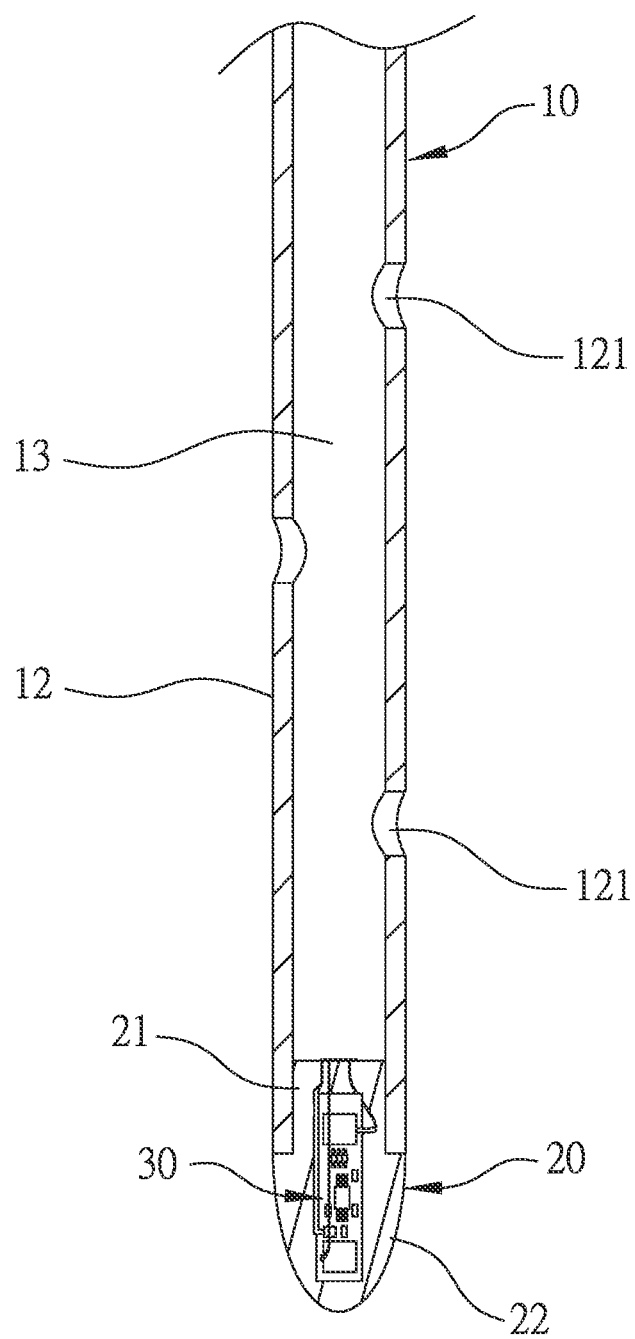
FIG. 4 is a cross sectional view showing the assembly components of the nasogastric tube according to the preferred embodiment of the present invention.
Figure 5:
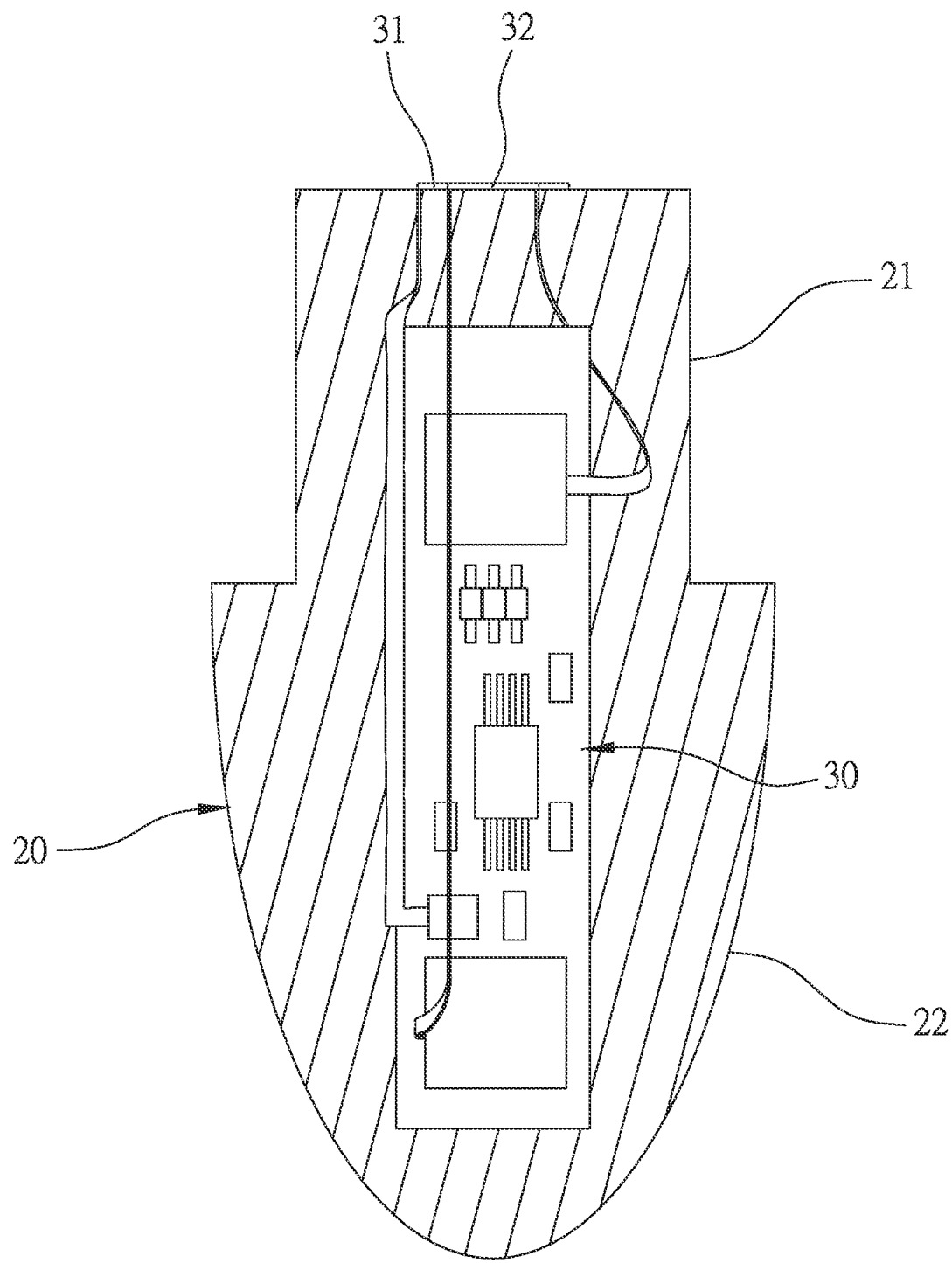
FIG. 5 is a cross sectional view showing a part of the assembly components of the nasogastric tube according to the preferred embodiment of the present invention.

The present invention will be clearer from the following description when viewed together with the accompanying drawings, which show, for purpose of illustrations only, a preferred embodiment in accordance with the present invention.

With reference to FIGS. 1-5, a nasogastric tube capable of sensing stomach acid according to a preferred embodiment of the present invention comprises: a body 10, a plug 20, and a pH (potential of hydrogen) sensor 30.

The body 10 is made of flexible material and is formed in a tubular shape, and the body 10 includes a feeding portion 11 formed on a first end thereof, a discharging portion 12 formed on a second end of the body 10, and a conduit 13 defined in the body 10 and communicating with the feeding portion 11 and the discharging portion 12, wherein the feeding portion 11 has a cap 111 configured to open and close the feeding 11 and to close the conduit 13, and the discharging portion 12 has multiple through orifices 121 defined thereon and communicating with the conduit 13.

The plug 20 includes a connecting portion 21 and a protruded portion 22, wherein the connecting portion 21 is formed in a column shape and is fitted on a distal end of the discharging portion 12, and the protruded portion 22 is exposed outside the distal end of the discharging portion 12, wherein the protruded portion 22 has a smooth surface to avoid injuring a nasal cavity and a esophagus, when the body 10 is inserted into a stomach via the nasal cavity and the esophagus.

The pH sensor 30 is adopted a passive power supply mode and is defined in the plug 20. In this embodiment, the pH sensor 30 is a micro pH sensor and is injection molded to integrate into the plug 20. The pH sensor 30 includes a pH sensing element 31 and two antennas 32 which partially expose in the conduit 13, the pH sensing element 31 is made of conducting material which is configured to produce different voltage response with a pH ion concentration in gastric juice, such that the pH sensing element 31 is configured to measure a pH value of the gastric juice. One of the two antennas 32 is configured to receive, and the other antenna 32 is configured to send, wherein the two antennas 32 wirelessly send the pH value of the gastric juice measured by the pH sensing element 31.

Figure 6:
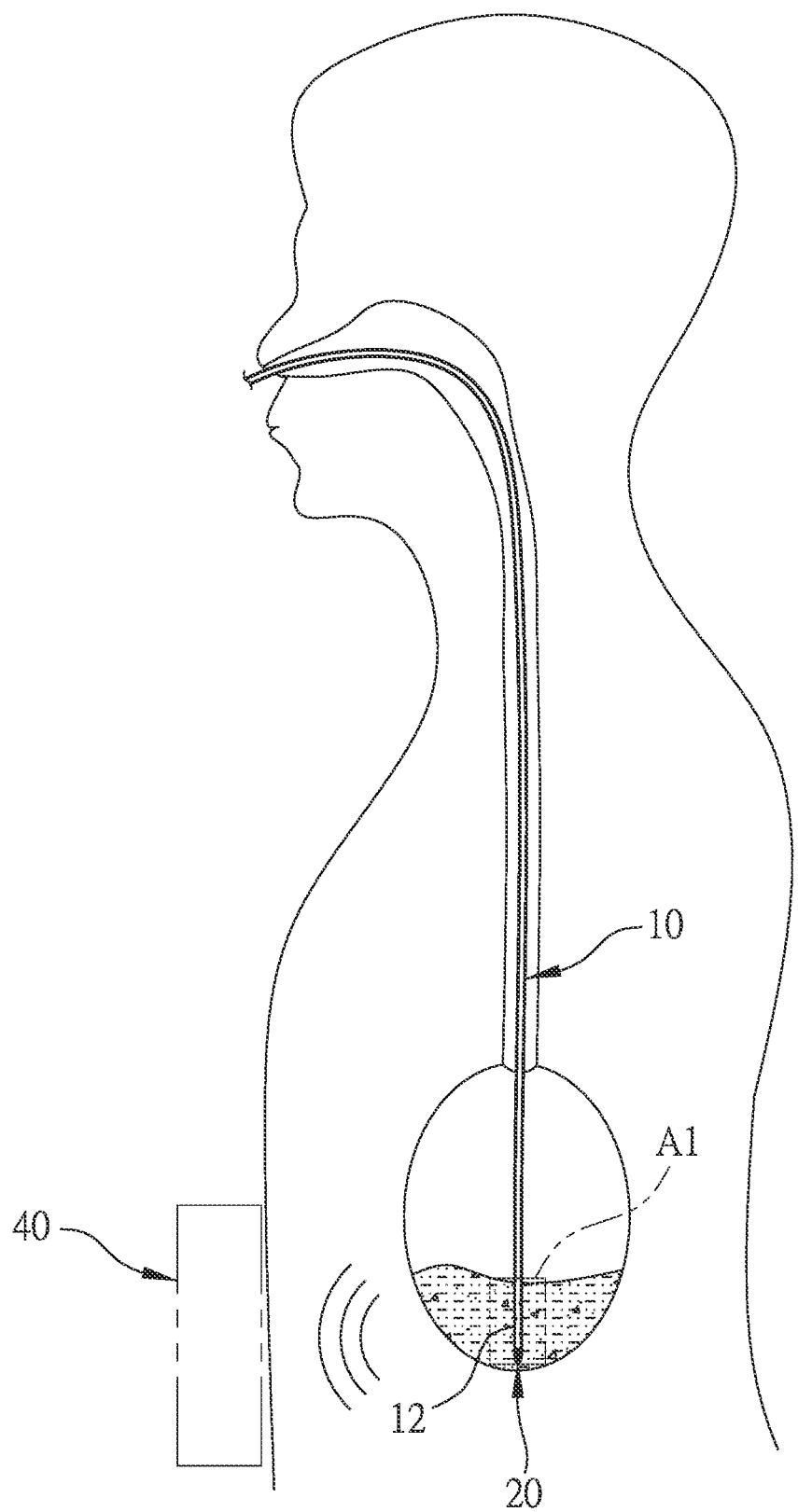
FIG. 6 is a side plan view showing the application of the nasogastric tube according to the preferred embodiment of the present invention.
Figure 7:
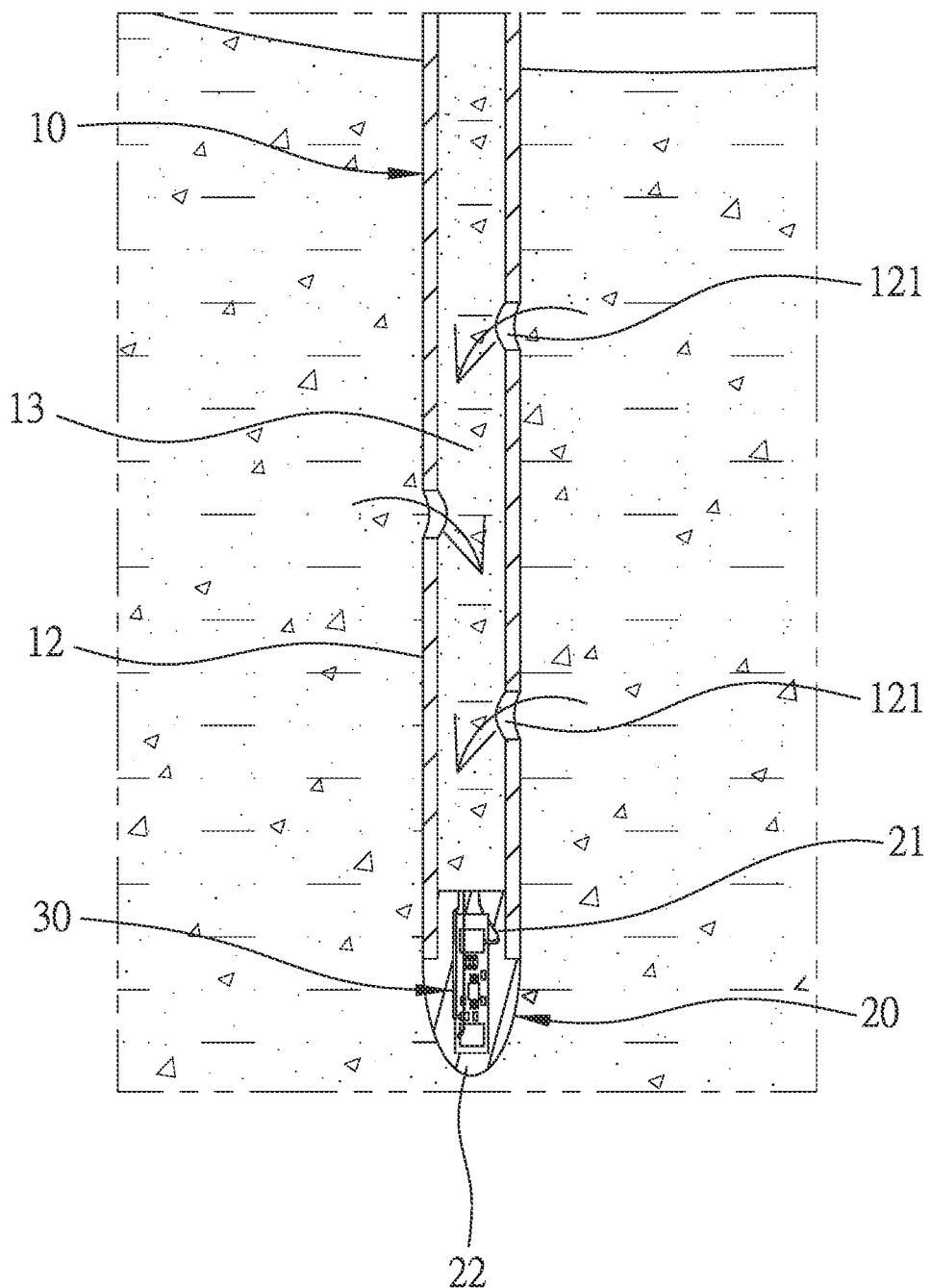
FIG. 7 is an amplified side plan view of a portion A1 of FIG. 6.

In use, as shown in FIGS. 6 and 7, the discharging portion 12 of the body 10 is inserted into the stomach via the nasal cavity and the esophagus to open/close the cap 111 of the feeding portion 11, such that liquid food is fed from the feeding portion 11 and is discharge out of the discharging portion 12 via the conduit 13, then the liquid food flows into the stomach from the multiple through orifices 121 of the discharging portion 12, thus feeding the liquid food completely to supplement required nutrients to a patient. When not feeding the liquid food, the gastric juice of the patient flows into the conduit 13 from the multiple through orifices 121 of the discharging portion 12 so as to contact with the pH sensing element 31 of the pH sensor 30, and different voltages producing with the pH ion concentration in the gastric juice are measured. Thereafter, the pH value is sent and displayed on a reader 40 via the two antennas 32, wherein the pH sensor does not require batteries and reference electrodes and is capable of measuring the pH value of the gastric juice successively, thus controlling a physical condition of the patient accurately by medical personnel.

Accordingly, the nasogastric tube of the present invention has advantages as follows:

1. The nasogastric tube comprises the pH sensor 30 integrate into the plug 20 and configured to receive and send wirelessly so that the pH value of the gastric juice is measured successively, and the medical personnel judges the physical condition of the patient accurately to feed the liquid food or give medicine timely.
2. When detecting the pH value of the gastric juice, the reader 40 directly receives the pH value which is wirelessly send from the pH sensor 30 of the nasogastric tube, thus avoiding extracting the gastric juice of the patient, relieving a pain of testing gastric acid and a workload of the medical personnel.

While various embodiments in accordance with the present invention have been shown and described, it is clear to those skilled in the art that further embodiments may be made without departing from the scope of the present invention.

What is claimed is:

1. A nasogastric tube capable of sensing stomach acid comprising:
    a body including a feeding portion formed on a first end of the body, a discharging portion formed on a second end of the body, and a conduit defined in the body and communicating with the feeding portion and the discharging portion, wherein the feeding portion has a cap configured to open and close the feeding portion and to close the conduit, and the discharging portion has multiple through orifices defined thereon and communicating with the conduit;
    a plug including a connecting portion and a protruded portion, wherein the connecting portion is formed in a column shape and is fitted on a distal end of the discharging portion, and the protruded portion is exposed outside the distal end of the discharging portion, wherein the protruded portion has a smooth surface; and
    a potential of hydrogen (pH) sensor injection molded to integrate into the plug, the pH sensor including a pH sensing element and two antennas wherein the pH sensing element and the two antennas are partially exposed within the conduit, wherein the pH sensing element is made of conducting material which is configured to produce different voltage response with a pH ion concentration in gastric juice, such that the pH sensing element is configured to measure a pH value of the gastric juice, wherein one of the two antennas is a receiving antenna configured to receive, and the other antenna is a sending antenna configured to send, and the pH value of the gastric juice measured by the pH sensing element is configured to be wirelessly sent by the sending antenna to a reader, and the reader is configured to display the pH value of the gastric juice.

* * * * *